US012475815B2

(12) United States Patent
King

(10) Patent No.: US 12,475,815 B2
(45) Date of Patent: Nov. 18, 2025

(54) MARKER DEVICES, MARKER SYSTEMS, AND CONTAINERS WITH MARKER PLATES THEREON FOR DISPLAYING PERSONALIZED INFORMATION, AND RELATED METHODS

(71) Applicant: Stitch Golf Holdings, Inc., Apex, NC (US)

(72) Inventor: Bradley P. King, Apex, NC (US)

(73) Assignee: Stitch Golf Holdings, Inc., Apex, NC (US)

( * ) Notice: Subject to any disclaimer, the term of this patent is extended or adjusted under 35 U.S.C. 154(b) by 198 days.

(21) Appl. No.: 17/513,799

(22) Filed: Oct. 28, 2021

(65) Prior Publication Data

US 2023/0139050 A1 May 4, 2023

(51) Int. Cl.
*G09F 3/02* (2006.01)
*G09F 3/20* (2006.01)

(52) U.S. Cl.
CPC ................ *G09F 3/204* (2013.01); *G09F 3/02* (2013.01)

(58) Field of Classification Search
CPC ...... G09F 7/18; G09F 7/04; G09F 2007/1882; G09F 2007/1852; A45C 13/42; F16M 11/02; F16M 11/20; F16M 13/00; F16M 2200/024
USPC .............................................................. 269/9
See application file for complete search history.

(56) References Cited

U.S. PATENT DOCUMENTS 2,432,338 A * 12/1947 Reilly ..................... B25C 11/00 254/19
2,471,764 A * 5/1949 Miller .................... G04D 1/027 968/671
3,301,263 A * 1/1967 Spees ...................... B42F 19/00 40/341
4,040,194 A 8/1977 Penton et al.
(Continued)

OTHER PUBLICATIONS

Amazing Magnets: WBP250E-White, webpage from the Amazing Magnets website, https://www.amazingmagnets.com/p-1441-wbp250e-white.aspx, printed Oct. 28, 2021.

*Primary Examiner* — Cassandra Davis
(74) *Attorney, Agent, or Firm* — Michael Best & Friedrich LLP

(57) ABSTRACT

Marker devices, marker systems, containers with markers thereon for displaying personalized information and related methods are provided. A marker device for displaying personalized information on a container can include a marker plate that includes a metal plate having first and second sides with a message on at least one of the first or second sides. The marker device can also include a marker housing attached to a container. The marker housing can include a base and perimeter walls extending upward from the base to form a marker receiving station. Further, the marker device can include a housing magnet positioned relative to the marker housing base to hold the marker plate in the marker receiving station. The marker plate can be inserted into the marker receiving station and held therein by the housing magnet. Additionally, the marker plate can be removed from the marker receiving station using a removal tool that has a puller magnet with a stronger magnetic field strength than a magnetic field strength of the housing magnet.

15 Claims, 11 Drawing Sheets

(56) References Cited

U.S. PATENT DOCUMENTS

| | | | | |
|---|---|---|---|---|
| 4,236,331 | A * | 12/1980 | Mattson | A44C 3/001<br>40/621 |
| 7,752,782 | B2 | 7/2010 | Peterson et al. | |
| 8,371,141 | B2 * | 2/2013 | Richmond | A44C 25/002<br>63/23 |
| 9,990,867 | B1 * | 6/2018 | Shiao | G09F 7/18 |
| 10,009,589 | B2 * | 6/2018 | Wu | G09F 9/33 |
| 10,070,698 | B1 * | 9/2018 | Stein | A44B 5/002 |
| 2012/0263895 | A1 * | 10/2012 | Jeter, Jr. | A41D 27/08<br>428/34.1 |
| 2019/0069675 | A1 | 3/2019 | Johannessen | |

* cited by examiner

MARKER DEVICES, MARKER SYSTEMS, AND CONTAINERS WITH MARKER PLATES THEREON FOR DISPLAYING PERSONALIZED INFORMATION, AND RELATED METHODS

TECHNICAL FIELD

The present subject matter relates to marker devices with exchangeable marker plates for attachment to items for identification purposes. In particular, the present subject matter relates to marker devices that can be attached to containers, such as bags, luggage, briefcases, or the like and having a marker housing and one or more exchangeable marker plates that permit a message presented by the marker plate in the marker housing to be changed.

BACKGROUND

People use different types of container to carry or store items that they want or need on a regular basis. These containers can include bags, which can include, but are not limited to, travel bags, wallets, backpacks, barracks bags, duffel bags, haversacks, knapsacks, rucksacks, satchels, totes, handbags, pocketbooks, purses, briefcases, garment bags, soft-walled coolers, or the like. These containers can also include chests, trunks, hard coolers, or the like.

Often, these containers include some type of personal expression that can identify to others something about the person using the respective container. For example, the container can include markers such as a logo, wording, or other marks in a prominent place to communicate to others something about the owner. Such markers can be a brand identifier of the company from which the container was purchased. Such brand identifiers can be a status symbol for the owner and an advertisement for the manufacturer/seller. Such markers can also include an affiliation identifier that shows an affiliation or connection of the owner with a company or organization with which the owner identifies. For example, the marker may include a logo of the company for which the owner works. Similarly, the marker may include a logo of a sports team for which the owner roots or has an affiliation. Additionally, the marker may include some type of personalized monogram, name, or initials of the owner to personal identify the owner. The marker may include some other identifier that tells a viewer something about the owner of the container.

Such markers are normally attached permanently to the container and are not removed when used to show sometime of an affiliation or as a personal identifier. Due the permanent attachment, an owner/user may need or want multiple containers to provide versatility in how the user/owner expresses themselves. For example, the owner/user may want or need a travel bag that identifies his affiliation with the company he works for when travelling for business, while the owner/user may want to have a personal identifier when traveling for leisure or a sports team identifier if traveling to support the sports team. Having multiple bags for the same purpose can be wasteful and can require extra storage space.

As such, a need exists for the ability for an owner/user to be given the freedom to express themselves using exchangeable markers that can be used on a single container, such as bags, luggage, briefcases, or the like to permit the owner/user to change the markers on the container at the owner/user's discretion.

SUMMARY

The present subject matter relates to marker devices, marker systems, containers with markers thereon for displaying personalized information and related methods. In particular, the present subject matter relates to marker devices that can be attached to containers, such as bags, luggage, briefcases, or the like and having a marker housing and one or more exchangeable marker plates that permit a message presented by the marker plate in the marker housing to be changed. Methods related to the use of these marker devices herein are also provided.

Thus, it is an object of the presently disclosed subject matter to provide marker devices with exchangeable marker plates used on containers as well as methods related thereto. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Figure 1:
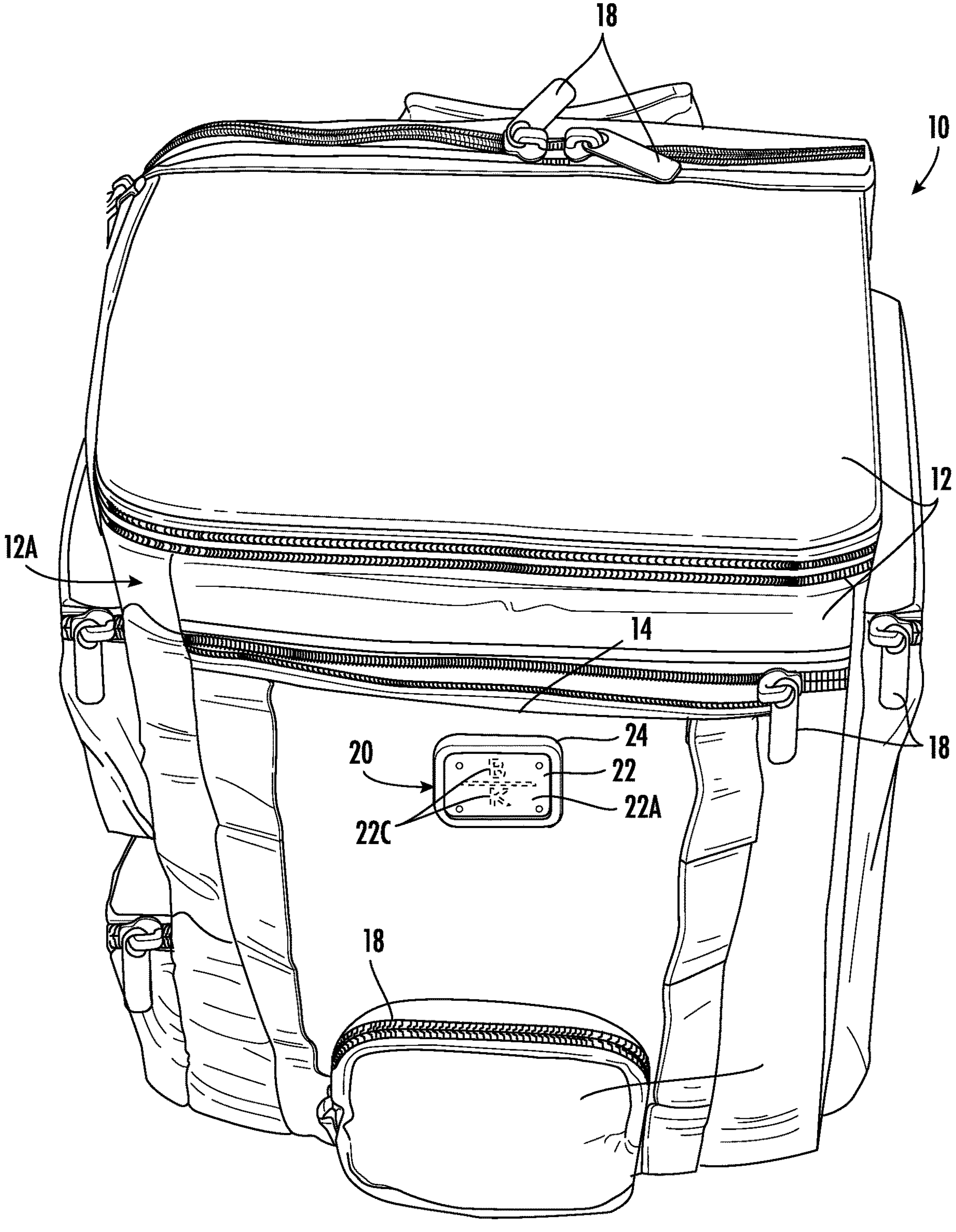
FIG. 1 illustrates a perspective view of an embodiment of a container on which an embodiment of a marker device is attached according to the present subject matter.

Repeat use of reference characters in the present specification and drawings is intended to represent the seam or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. It is to be understood by one of ordinary skill in the art that the present discussion is a description of exemplary embodiments only and is not intended as limiting the broader aspects of the present subject matter, which broader aspects are embodied in exemplary constructions.

Although the terms first, second, right, left, front, back, top, bottom, etc. may be used herein to describe various features, elements, components, regions, layers and/or sections, these features, elements, components, regions, layers and/or sections should not be limited by these terms. These terms are only used to distinguish one feature, element, component, region, layer, or section from another feature, element, component, region, layer, or section. Thus, a first feature, element, component, region, layer, or section discussed below could be termed a second feature, element, component, region, layer, or section without departing from the teachings of the disclosure herein.

Similarly, when a feature or element is being described in the present disclosure as "on" or "over" another feature or element, it is to be understood that the features or elements can either be directly contacting each other or have another feature or element between them, unless expressly stated to the contrary. Thus, these terms are simply describing the relative position of the features or elements to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements, or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted, or simplified to facilitate explanation of the subject matter disclosed herein. Thus, the features, elements or components illustrated in the figures are schematic in nature and their shapes and/or positions are not intended to illustrate the precise configuration of the subject matter and are not necessarily intended to limit the scope of the subject matter disclosed herein unless it specifically stated otherwise herein.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

The term "message" is used herein to mean any personalized information that is to be displayed on a side of a marker plate for a marker device that can be attached to a container and can include, but is not limited to, initials, a monogram, a logo of a sports team, a logo of company, a phrase, a word, a design an image, or the like.

The term "container" as used herein means any structure used for holding and carrying items therein, and can include, but is not limited to, hardwalled (hardshell) containers such as chest, trunks, briefcase, luggage, suitcases, coolers or the like, or softwalled (softshell) containers, such as duffle bags, garment bags, diaper bags, backpacks, briefcases, handbags, luggage, suitcases, all-purpose carrying bags, attaché cases, purses, cosmetic bags, overnight bags, tote bags, travel bags, coolers, or the like.

The present subject matter relates to marker devices, marker systems, containers with marker devices thereon for displaying personalized information and related methods. The marker devices attached to containers such as bags, luggage, briefcases, or the like, that can display identifying information on one or more exchangeable marker plates. The marker devices can comprise a marker housing and one or more exchangeable marker plates that permit a message presented by the marker plate that resides in marker housing to be changed. For example, a marker device for displaying personalized information on a container can include a marker that includes a metal plate having first and second sides with a message on at least one of the first or second sides. The marker device can also include a marker housing attached to a container. The marker housing can include a base and perimeter walls extending upward from the base to form a marker receiving station. Further, the marker device can include a housing magnet positioned relative to the marker housing base to hold the marker in the marker receiving station. The marker can be inserted into the marker receiving station and held therein by the housing magnet. Additionally, the marker can be removed from the marker receiving station using a removal tool that has a puller magnet with a stronger magnetic field strength than a magnetic field strength of the housing magnet.

Referring to FIG. 1, a container, generally 10, is provided for illustrative purposes on which a marker device 20 that can be used to display personalized information can reside. The container 10 can comprise one or more walls 12, such a side walls 12A, a top wall 12B, or top, and a bottom wall (not shown), or bottom, which can form an internal cavity into which items can be placed. The side walls 12B and/or top 12B can comprise one or more pockets 14, 16. For example, as shown in FIG. 1, the front side wall 12A has a pocket 14 that is integrated into the side wall 12A. Additionally, the side walls 12A can have pockets, like pocket 16, that can extend outward from different portions of the side wall 12A. Similarly, integrated pockets, like pocket 14, and externally extending pockets, like pocket 16, can reside in or on the top 12B.

The container 10 can be a variety of different container, including hardwalled (hardshell) containers such as chest, trunks, briefcase, luggage, suitcases, coolers, or the like, or softwalled (softshell) containers, such as duffle bags, garment bags, diaper bags, backpacks, briefcases, handbags, luggage, suitcases, all-purpose carrying bags, attaché cases, purses, cosmetic bags, overnight bags, tote bags, travel bags, coolers, or the like. Thus, the container 10 can come in a variety of different shapes, sizes, and constructions and the closeable opening to access the internal cavity can be formed and operate in different ways. In the travel bag embodiment of the container 10 shown in FIG. 1, the internal cavity (not shown) of the travel bag 10 can be accessed through the top wall 12B. For example, fasteners 18, in the form a zipper in this embodiment, can be used to hold the top wall 12B to the side walls 12A in a closed position. The fasteners 18 can be released, i.e., unzipped in this travel bag embodiment, to fold back the top wall 12B and access the internal cavity. While shown as a zipper, fasteners can be a variety of different fastening mechanisms, as well, including but not limited to button, snaps, clips, hook and loop fasteners, such as VELCRO®, or the like. Similarly, if the container 10 includes pockets, such as pockets 14, 16, these pockets may include fasteners, such as fasteners 18.

As stated above, the container 10 can include a marker device 20 for displaying personalized information on a container 10. Referring to FIGS. 1, 2A, 3A, 3B, and 4, the marker device 20 can comprise a marker plate 22 which can comprise a metal plate having a first side 22A and a second side 22B with at least one message 22C (see FIG. 1) on at least one of the first side 22A or the second side 22A and having a thickness $T_{MP}$. In some embodiments, the metal of the marker plate 22 can comprise an iron. In some embodiments, the metal of the marker plate 22 can comprise an iron plated in brass. The message can include personalized information that owner wants to display on the container, such as travel bag 10. The message 22C can be printed, painted, or engraved on one or both sides 22A, 22B of the marker plate 22. For example, the message 22C on the marker plate 22 can comprises an acrylic paint or ink.

Figure 4:
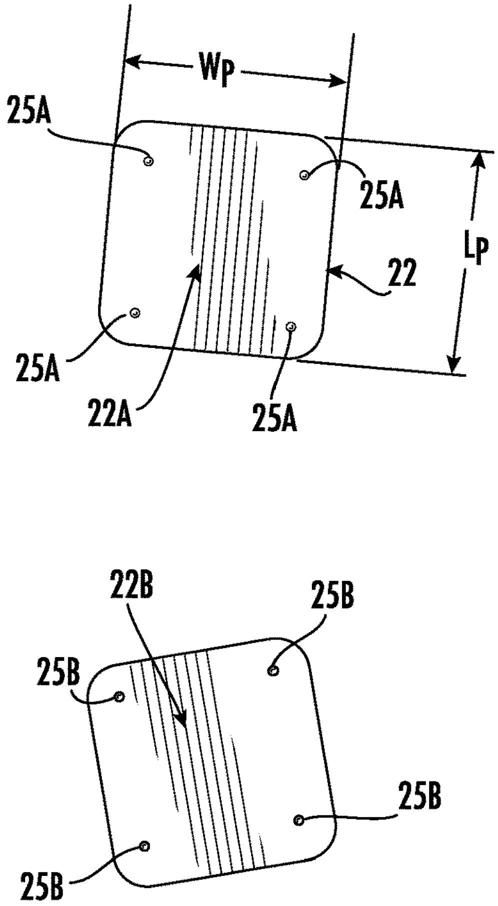
FIG. 4 illustrates a front and back side views of an embodiment of a marker plate of a marker device according to the present subject matter.
Figure 5:
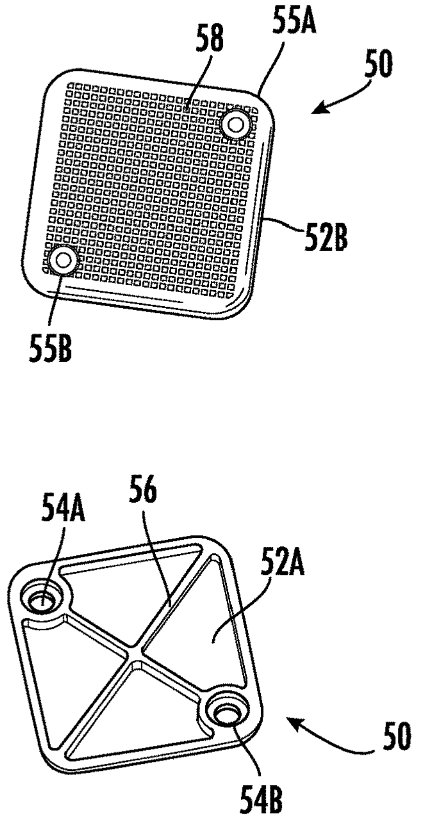
FIG. 5 illustrates a front and back side views of an embodiment of a back plate of a marker device according to the present subject matter.

As shown in FIG. 4, the marker plates 22 can comprise comprises one or more protrusion 25 on the first side 22A to identify the first side 22A from the second side 22B of the marker plate 22. Only one protrusion 25A is needed to identify the first side 22A from the second side 22B. The number and placement of the protrusion(s) 25A can be an aesthetic design choice. The one or more protrusion 25 can be of any shape. In some embodiments, the one or more protrusions 25 can be molded on marker plate 22 during formation of the marker plate 22 if it is formed using a mold. In some embodiments, the one or more protrusions 25 can be formed using a punch device. In such embodiments, during the formation of a protrusion 25A on the first side 22A of the marker plate 22, an indention 25B can be formed on the second side 22B of the marker plate 22 which in turn can be used to identify the second side 22B.

A plurality of marker plates 22 can be provided. Each marker plate 22 can have a message, such as the owner's initials, a monogram, a logo of a sports team, a logo of company for which the owner of the travel bag work, or a name or logo of another company or organization with which the owner identifies, engraved, printed, or painted on one or more sides 22A, 22B of each respective marker plate 22. These marker plates 22 are interchangeable and can be changed at the owner's desire to change the personalized information that the marker device 20 displays on the container 10 as will be explained in more detail below.

The marker device 20 can also comprise a marker housing 24 that can be attached to the container 10. In some embodiments, the attachment of the marker housing 24 can be done, for example, during the manufacture of the container 10 such that the marker housing is intended to be permanently secured to the container 10 as shown in FIG. 1. Referring to 2A-3B and 6A-6C, the marker housing 24 can comprise a base 24A and perimeter walls 24B extending upward from the base 24A to form a marker receiving station 26 (See FIG. 6A-6C). The marker receiving station 26 is configured to receive and hold the marker plate 22 therein such that either the first side 22A or the second side 22B is facing outward from the marker housing 24.

The perimeter walls 24B can be shaped so that the marker receiving station 26 is sized and shaped closely fit the marker plate 22 therein. For example, if the marker plates 22 has rounded edges as shown in FIG. 4, the perimeter walls 24B can curve to form curved corners in the marker receiving station 26 to accept the curved rounded edges of the marker plate 22. Thereby, the tolerances between the inner portion of the perimeter walls 24B and the marker plate 22 with the mark plate is placed in the receiving station 26 can be small. For example, in some embodiments, the tolerance can be between about 0.05 millimeters and 0.5 millimeters. Thus, the marker plate 22 can have a width $W_P$ that is close in measurement to a width $W_S$ of the receiving station 26. Similarly, the marker plate 22 can have a length $L_P$ that is close in measurement to a length $L_S$ of the receiving station 26. In this manner, the likelihood of the marker plate 22 being dislodged from the marker receiving station 26 in the marker housing 24 is lessened.

Figure 2A:
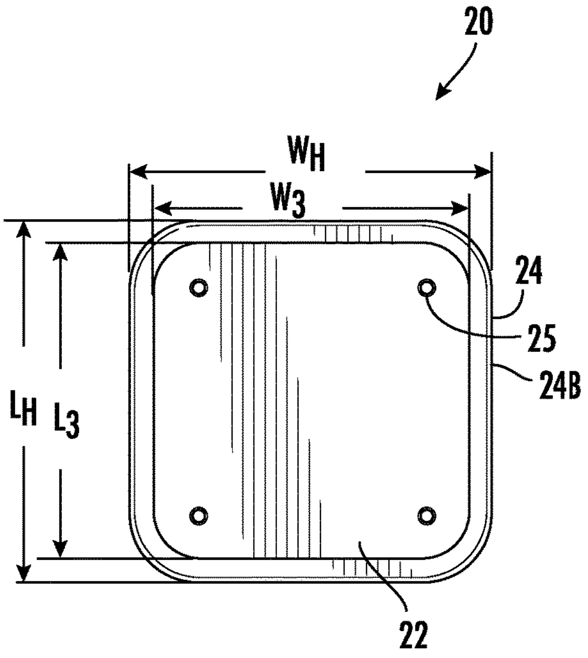
FIG. 2A illustrates a top plan view of an embodiment of a marker device according to the present subject matter.
Figure 2B:
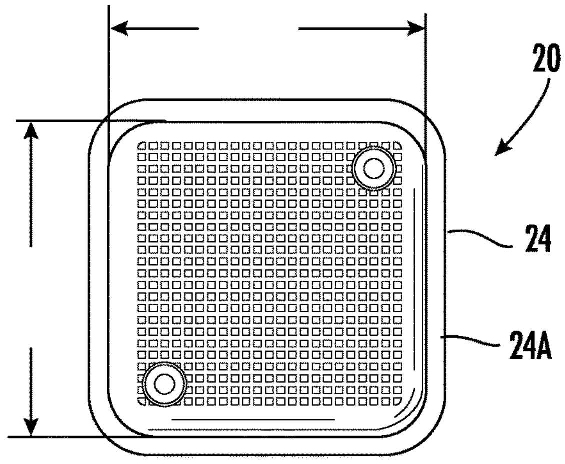
FIG. 2B illustrates a bottom plan view of the embodiment of the marker device according to FIG. 2A.
Figure 2C:
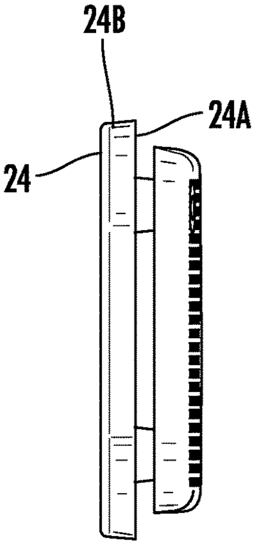
FIG. 2C illustrates a left side plan view of the embodiment of the marker device according to FIG. 2A.
Figure 2D:
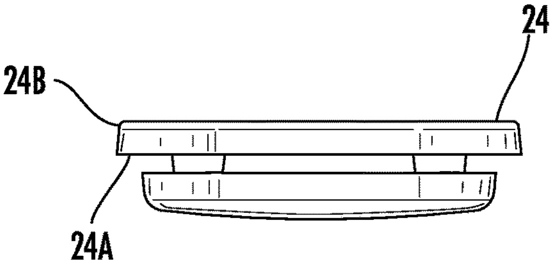
FIG. 2D illustrates a front side plan view of the embodiment of the marker device according to FIG. 2A.

The perimeter walls 24B of the marker housing 24 can have a thickness that also helps prevent the marker plate 22 from being dislodged during use of the container 10. The base 24A of the marker housing 24 can comprise a first side 24$A_1$ and a second side 24$A_2$ with the perimeter walls 24B extending from the first side 24$A_1$ of the base 24A. In some embodiments, the marker housing 24 can have a different shape from the shape of the marker plate 22. In such embodiments, the perimeter walls 24 can be inward on the outer edges of the base 24A of the marker housing 24 and can be contoured on the perimeter walls inner sides to form a contour of the marker receiving station 26 in which the marker plate 22 fits. In some embodiments, the marker housing 24 can have a shape that is similar to the shape of the marker plate 22 as shown FIG. 2A, 6A, and 6B. The perimeter walls 24B can extend upwards from the outer edges of the base 24A of the marker housing 24. The perimeter walls 24B can be defined between the outer edges of the marker housing 24 and the marker receiving station 26. In such embodiments, for example, as shown in FIG. 2A, the marker housing 24 and the base 24A can have a width $W_H$ and a length $L_H$ while the marker receiving station 26 can have the width $W_S$ and the length $L_S$. The thickness of the perimeter walls 24B in such embodiments can be the difference between the width $W_H$ of the marker housing 24 and the width $W_S$ of the marker receiving station 26 and between the length $L_H$ of the marker housing 24 and the length $L_S$ of the marker receiving station 26. Also, to aid in preventing the marker plate 22 from being dislodged during use of the container 10, the perimeter walls 24 can have a height $H_W$ that can be about equal to or greater than the thickness $T_{MP}$ of the marker plate 22.

Figure 6A:
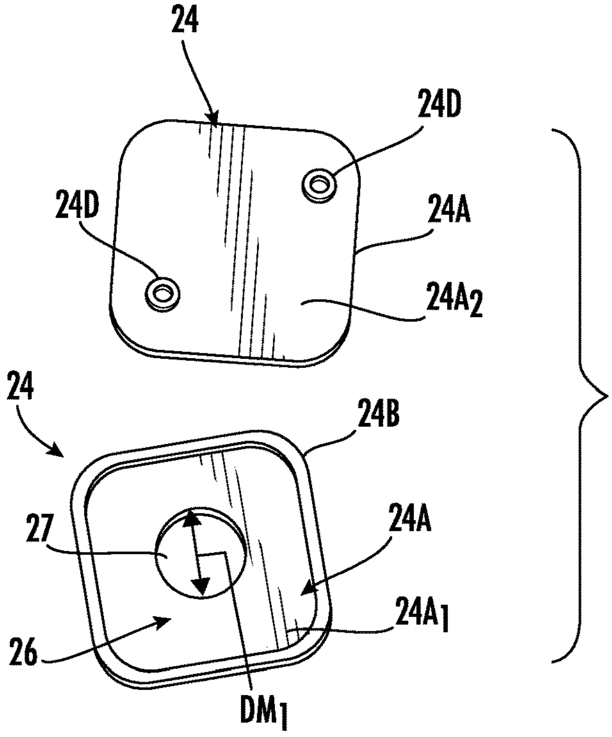
FIG. 6A illustrates a front and back side views of an embodiment of a marker housing of a marker device according to the present subject matter.
Figure 6B:
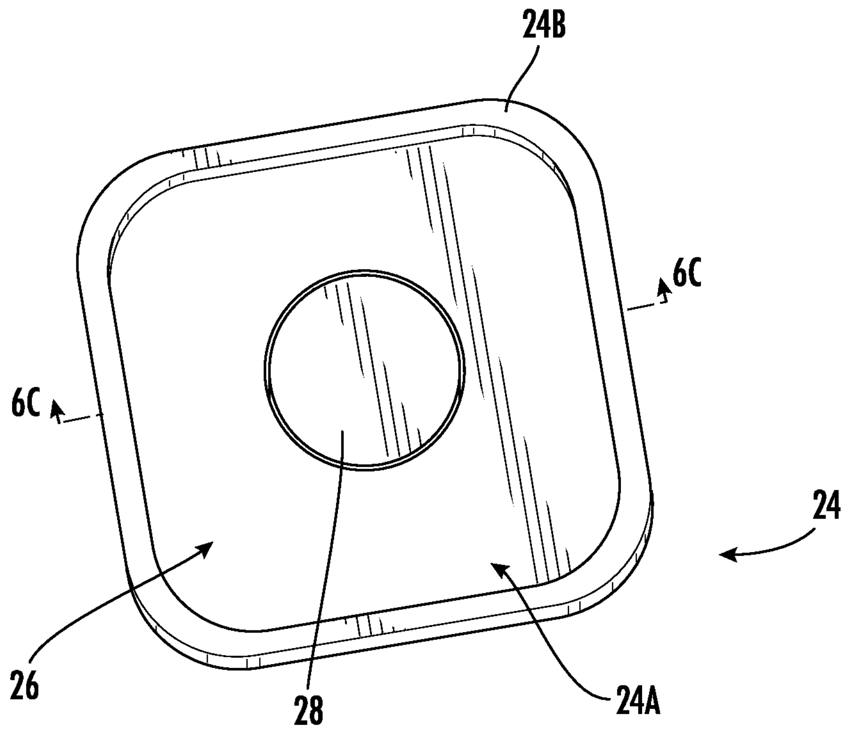
FIG. 6B illustrates a top perspective view of an embodiment of a marker housing of a marker device with an embodiment of a housing magnet therein according to the present subject matter.
Figure 6C:
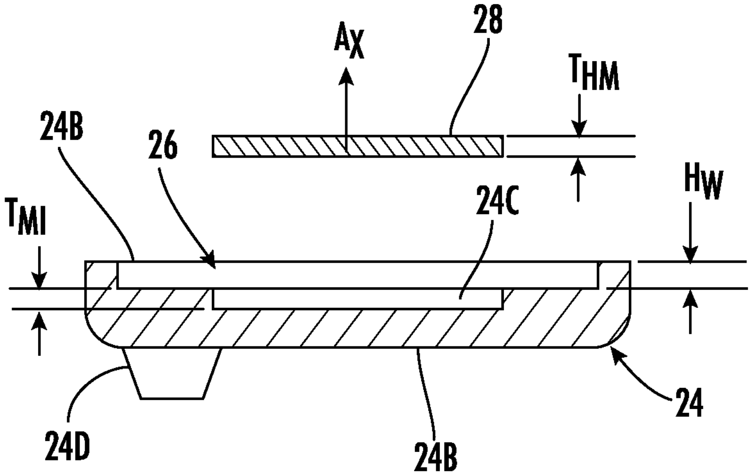
FIG. 6C illustrates an exploded side cross-sectional view of the embodiment of the marker housing of a marker device according to FIG. 6B taken along the lines A-A.
Figure 7:
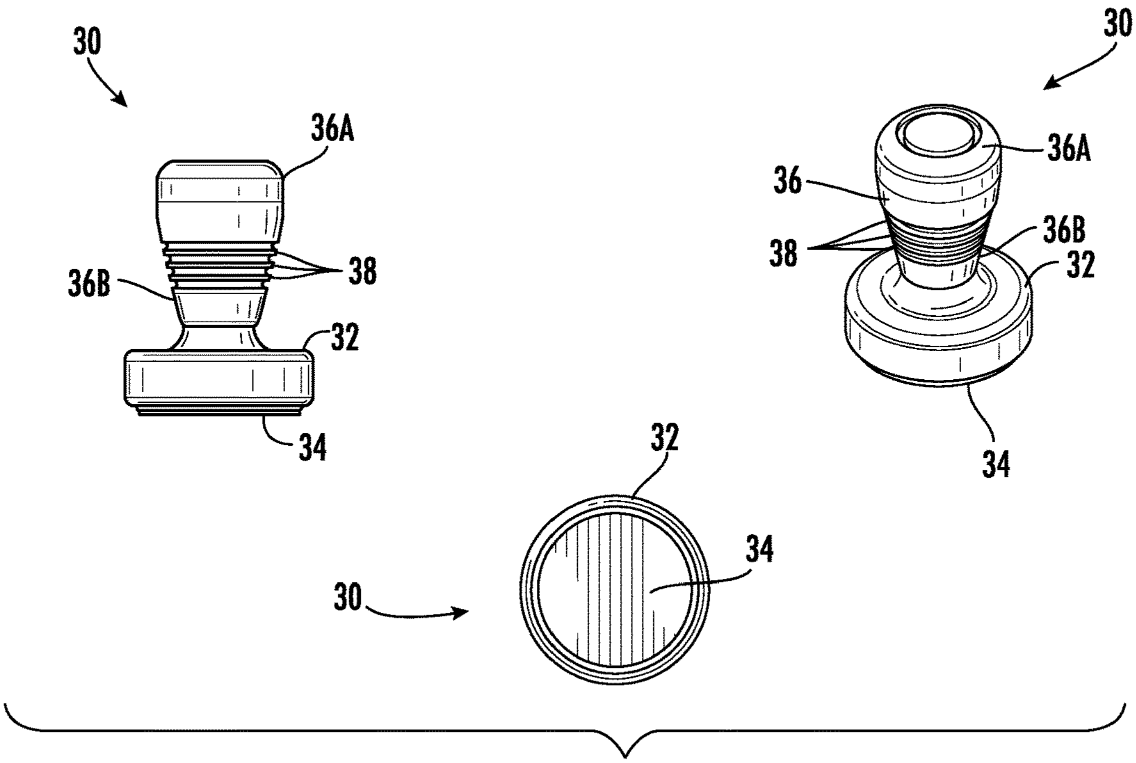
FIG. 7 illustrates a perspective view, a side plan view and a bottom plan view of an embodiment of a removal tool according to the present subject matter.
Figure 8:
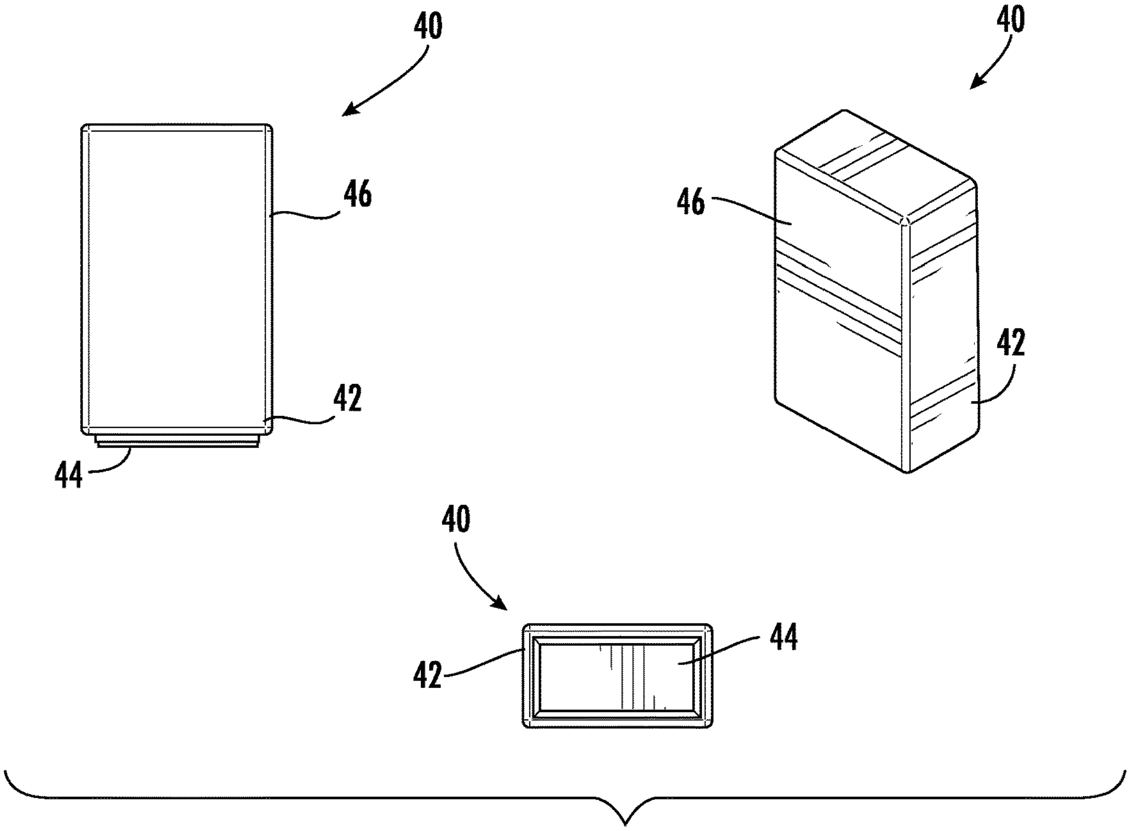
FIG. 8 illustrates a perspective view, a side plan view, and a bottom plan view of another embodiment of a removal tool according to the present subject matter.

Further, referring to FIGS. 6B and 6C, the marker device 20 can comprise a housing magnet 28 that can be positioned relative to the base 24B of the marker housing 24 to hold the marker plate 22 in the marker receiving station 26 of the marker housing 24 within the perimeter walls 24B. In particular, the magnetic field strength of the housing magnet 28 can be strong enough to continually hold the marker plate 22 as shown in FIGS. 1 and 2A in the marker receiving station 26 until the marker plate 22 is pried out of the marker receiving station 26 by force or pulled out of the marker receiving station 26 by a magnet with a stronger magnetic field strength. For example, the housing magnet 28 has a magnetic field strength of between about 120 millitesla (mT) to about 140 mT. By having a housing magnet 28 with sufficient magnetic strength, the marker plate 22 will stay in the marker receiving station 26 until such time that the owner wants to change out the marker plate 22 or remove it. Thus, in use, a marker plate 22 with a message 22C on one of its first or second side 22A, 22B can be inserted into the marker receiving station 26 of the marker housing 24 and held in the marker receiving station 26 by the housing magnet 28 such that the message 22C on the marker plate 22 is facing outward from the marker housing 24. The marker plate 22 can be removed from the marker receiving station 26 of the marker housing 24 using a removal tool 30, 40 as shown in FIGS. 3B, 7 and 8, that has a puller magnet 32, 42 therein with a stronger magnetic field strength than a magnetic field strength of the housing magnet 28.

In some embodiments, the housing magnet 28 can be secured to the base 24A of the marker housing 24. For example, as shown in FIG. 6A-60, the first side 24$A_1$ of the base 24A of the marker housing 24 can comprise an indentation 27, i.e., a magnet well, that is shaped to receive the housing magnet 28 therein for holding the marker plate 22 within the marker housing 24. For instance, the indentation 27 in the first side 24$A_1$ of the base 24A of the marker housing 24 can comprise a depth $T_{MI}$ that corresponds to a thickness $T_{HM}$ of the housing magnet 28. Additionally, if the housing magnet 28 is cylindrical, the indentation 27 in the first side 24$A_1$ of the base 24A of the marker housing 24 can comprise a diameter $D_{MI}$ that corresponds to a diameter of the housing magnet 28. The housing magnet 28 can be held in the indentation 27 by press fit or by an adhesive or epoxy or by both.

The marker device 20 can be held to the container 10 in a variety of ways and can depend on the type of container. In the embodiment of the marker device 20 shown in FIG. 1-6C, the marker device 20 can additionally comprise a back plate 50 that can receive a portion of the marker housing 24 to secure the marker housing 24 to the container 10 such that the marker housing 24 resides on an outward portion of the container 10. For example, in the embodiments shown, the marker housing 24 can comprise one or more securement pegs 24D that extends outward from the second side 24$A_2$ of the base 24A and the back plate 50 comprises a first side 52A and a second side 52B with sockets 54A, 54B disposed on the first side 52A of the back plate 52 that can correspond to the number of securement pegs 24D. The sockets 54A, MB are configured to correspondingly receive the one or more securement pegs 24D. For containers, such as the travel bag 10, shown in FIG. 1, one or more fabric layers in a wall 12 into which the marker device 20 is to be secured can have reinforced apertures therein to receiving the securement pegs 24D of the marker housing 24 therethrough. The securement pegs 24D of the marker housing 24 can be inserted into the reinforced apertures in one or more fabric layers in a wall 12 and pressed into the sockets 54A, 54B of the back plate 52. The securement pegs 24D of the marker housing 24 The housing magnet 28 can be held in the sockets 54A, 54B of the back plate 52 by press fit or by an adhesive or epoxy or by both. The second side 52B of the back plate 52 can comprise a knurled grid 58 and press indentations 55A, 55B that align with the sockets 54A, 54B of the back plate 52. The press indentations 55A, 55B can be used to aid in pressing the sockets 54A, 54B onto the securement pegs 24D of the marker housing 24. The back plate 52 can reside on the internal cavity of the container 10 or within the layers of wall to which the marker device 20 is attached.

Figure 3A:
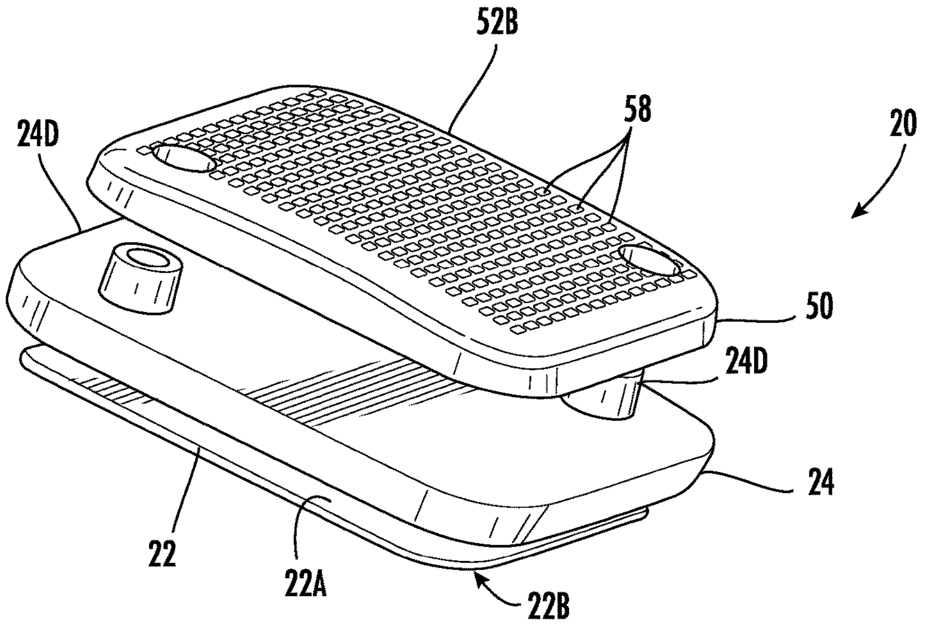
FIG. 3A illustrates a rear perspective exploded view of an embodiment of a marker device according to the present subject matter.
Figure 3B:
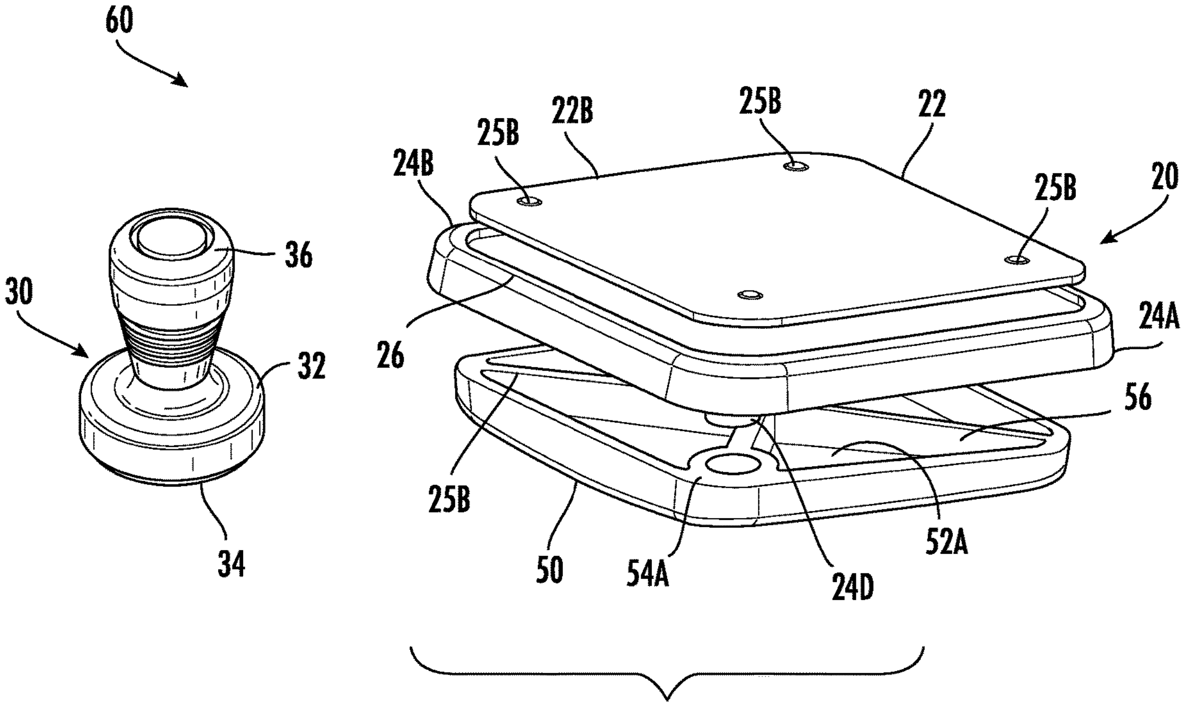
FIG. 3B illustrates an embodiment of a marker system, including a front perspective exploded view of an embodiment of a marker device and a side perspective view of an embodiment of a removal tool according to the present subject matter

Thus, a marker system 60 as shown in FIG. 3A can be provided that can be used for displaying changeable personalized information on a container, such as travel bag 10 shown in FIG. 1. The mark system 60 can comprise one or more marker plates 22 where each marker plate 22 can comprise a metal and can comprise a first side 22A and a second side 22B with at least one message 22C on at least one of the first side 22A or the second side 22B. The marker system 60 can comprise a marker housing that is attachable to a container. The marker housing can comprise a base and perimeter walls extending upward from the base to form a marker receiving station. The marker system 60 can also comprise a housing magnet positioned relative to the base of the marker housing to hold the marker in the marker receiving station of the marker housing within the perimeter walls. Further, the marker system 60 can comprise a removal tool 30 comprising a handle portion 36 and a puller magnet 34. The removal tool 30 Can be configured to a remove a marker plate 22 from the marker receiving station 26 in the marker housing 24. To accomplish this, as stated above, the puller magnet 34 having a magnetic field intensity that is greater than the magnetic field intensity of the housing magnet 28. As stated above, the housing magnet 28 in the marker plate housing 24 can have a magnetic field strength of between about 120 millitesla (mT) to about 140 mT. The puller magnet 34 of the removal tool 30 can have a magnetic field strength of greater than about 140 mT.

The removal tools can come in a variety of shapes and sizes. For example, referring to FIG. 7, an embodiment of the removal tool 30 is shown in more detail. The puller magnet 30 can comprise a magnet base 32 holding a puller magnet 34 and a handle section 36. In the embodiment shown, the handle 36 of the removal tool 30 can have a tapered section 36B comprising a tapering circular cross-section that tapers from a top 36A of the handles toward the magnet base 32 to allow the handle portion 36 to be easily held between a thumb and a finger of a user. The handle 36 can have a textured grip 38 on the tapered section 36B. The textured grip 38 can be any arrangement or structure that will likely increase the hold of the handle 36 between the thumb and a finger of the user. For example, as shown one or more gripping rings 38 can be provided around a portion of the tapered section 36B of the handle 36. The type of textured grip 38, for example, the number of gripping rings can be a design choice and can provide aesthetic value. The magnet base 32 of the removal tool 30 can be shaped to hold and protect the magnet 34 such that the sidewalls of the magnet base 32 generally cover the side walls of the puller magnet 34 with only a small portion of the puller magnet extending out from the magnet base 32. the puller magnet 34 can reside within the magnet base 32 of the removal tool 32 with an axis of the puller magnet 34 extending about parallel with an axis of the handle section 36 so that the puller magnet 34 in the magnet base is axially magnetized along the axis.

Referring to FIG. 8, another embodiment of the removal tool 40 is provided. The puller magnet 40 can comprise a magnet base 42 holding a puller magnet 44 and a holding (or handle) section 46. In the embodiment shown, the removal tool 40 can have a shape of a rectangular box or brick with little distinction between the holding section 46 and the magnet base 42 from the exterior of the removal tool 40. The holding section 46 can have a textured surface to increase the hold of the holding section 46 between the thumb and one or more fingers of the user. The magnet base 42 can be shaped to hold and protect the magnet 44 such that the sidewalls of the magnet base 42 generally cover the side walls of the puller magnet 44 with only a small portion of the puller magnet extending out from the magnet base 42.

The system 60 can also comprise a back plate 50 as described above that receives a portion of the marker housing 24 to secure the marker housing 24 to a container 10 such that the marker housing 24 resides on an outward portion of the container 10. For example, the marker housing 24 can further comprise one or more securement pegs 24D can extend outward from the second side 52B of the base 52. The back plate 50 can comprise a first side 52A and a second side 52B with one or more sockets 54A, 54B deposed on the first side 52A of the back plate for correspondingly receiving the one or more securement pegs 24D. In some embodiments, the first second side of the back plate 50 comprises a knurled grid 58.

Figure 9:
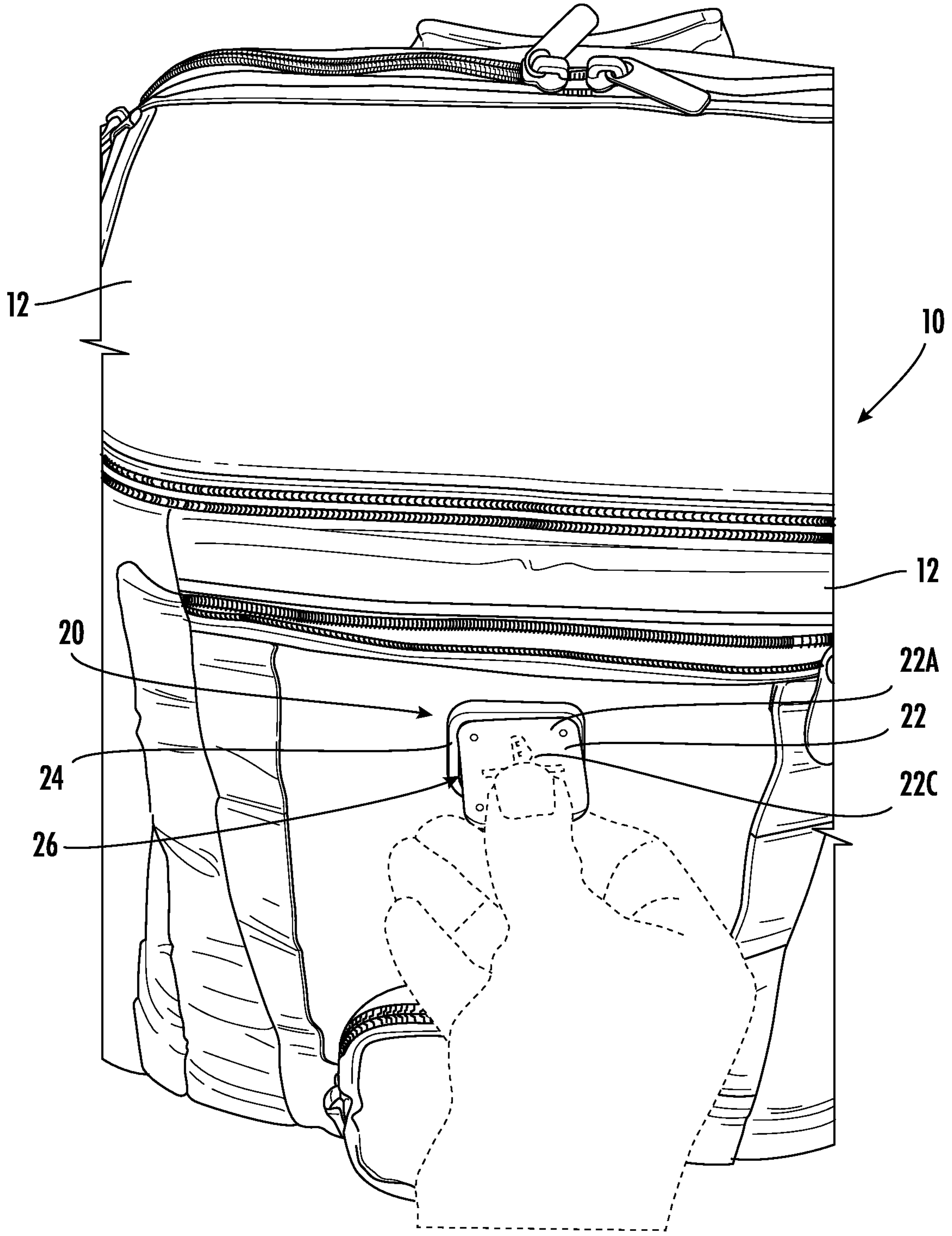
FIG. 9 illustrates a perspective view of a portion of the embodiment of the container with the embodiment of the marker device thereon according to FIG. 1 showing insertion of a marker plate into a marker receiving station of a marker housing according the present subject matter.
Figure 10:
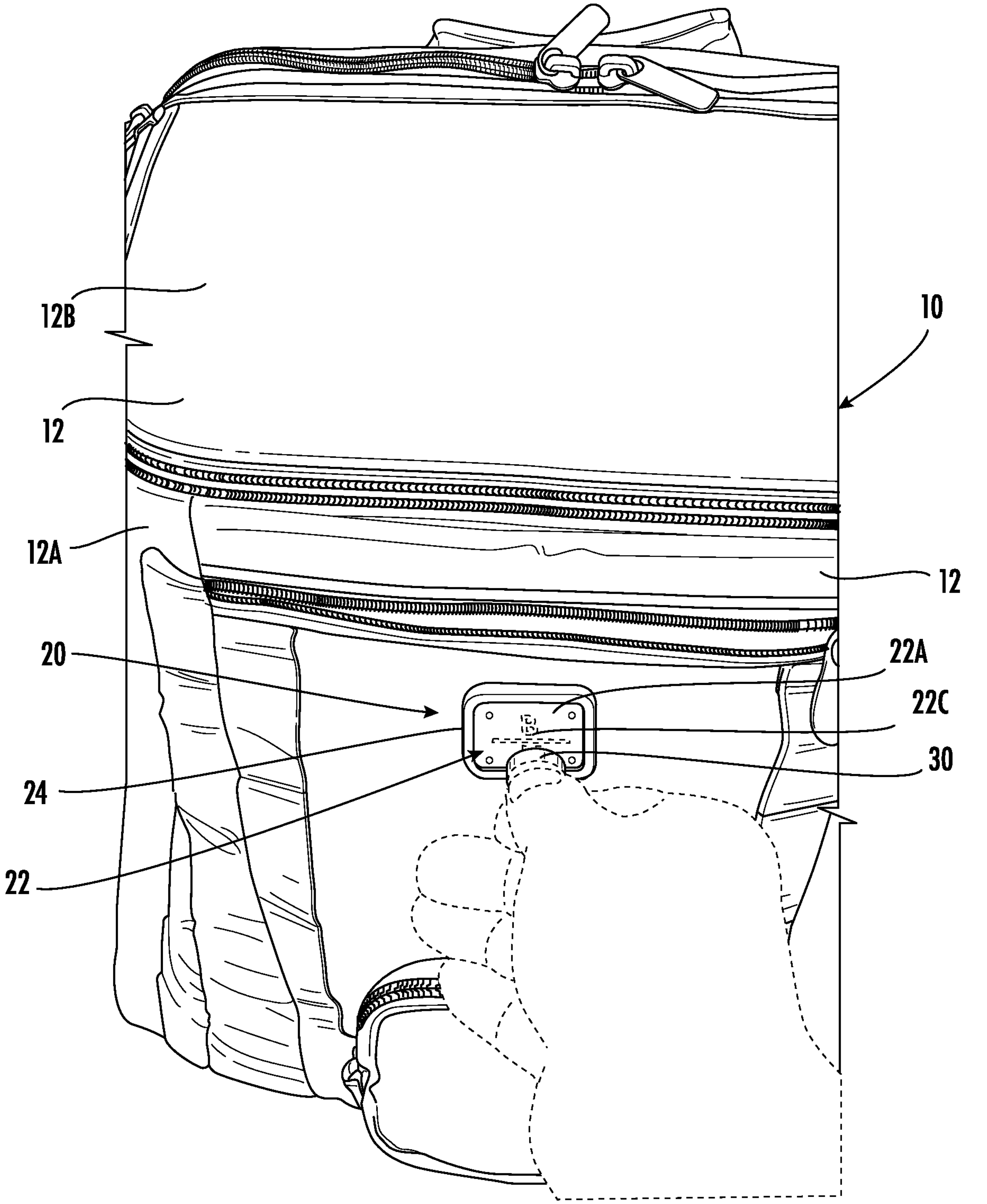
FIGS. 10 and 11 illustrate perspectives view of the portion of the embodiment of the container with the embodiment of the marker device thereon according to FIG. 9 showing removal of the marker plate from the marker receiving station of the marker housing using a removal tool according the present subject matter.
Figure 11:
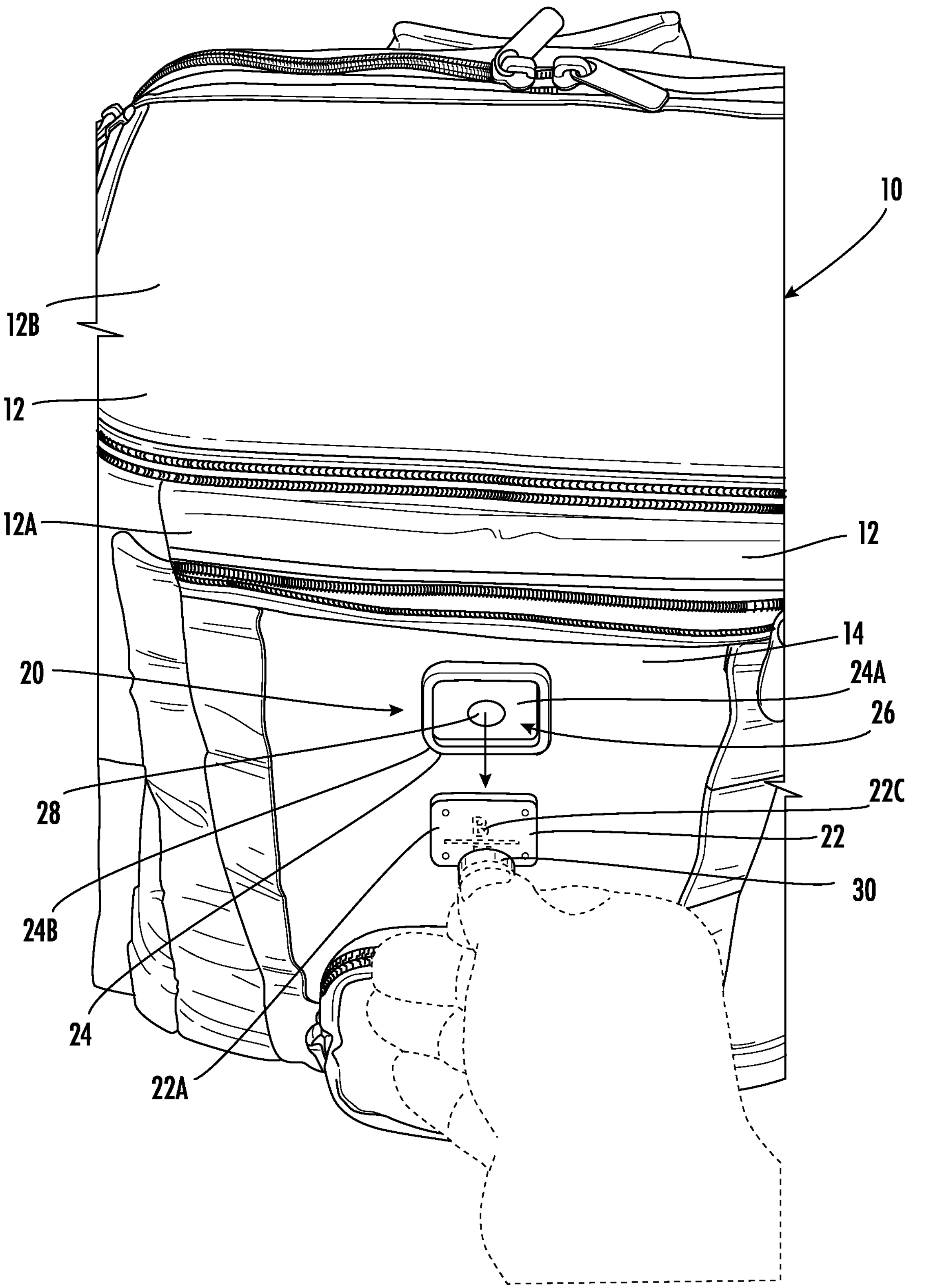
Figure 12:
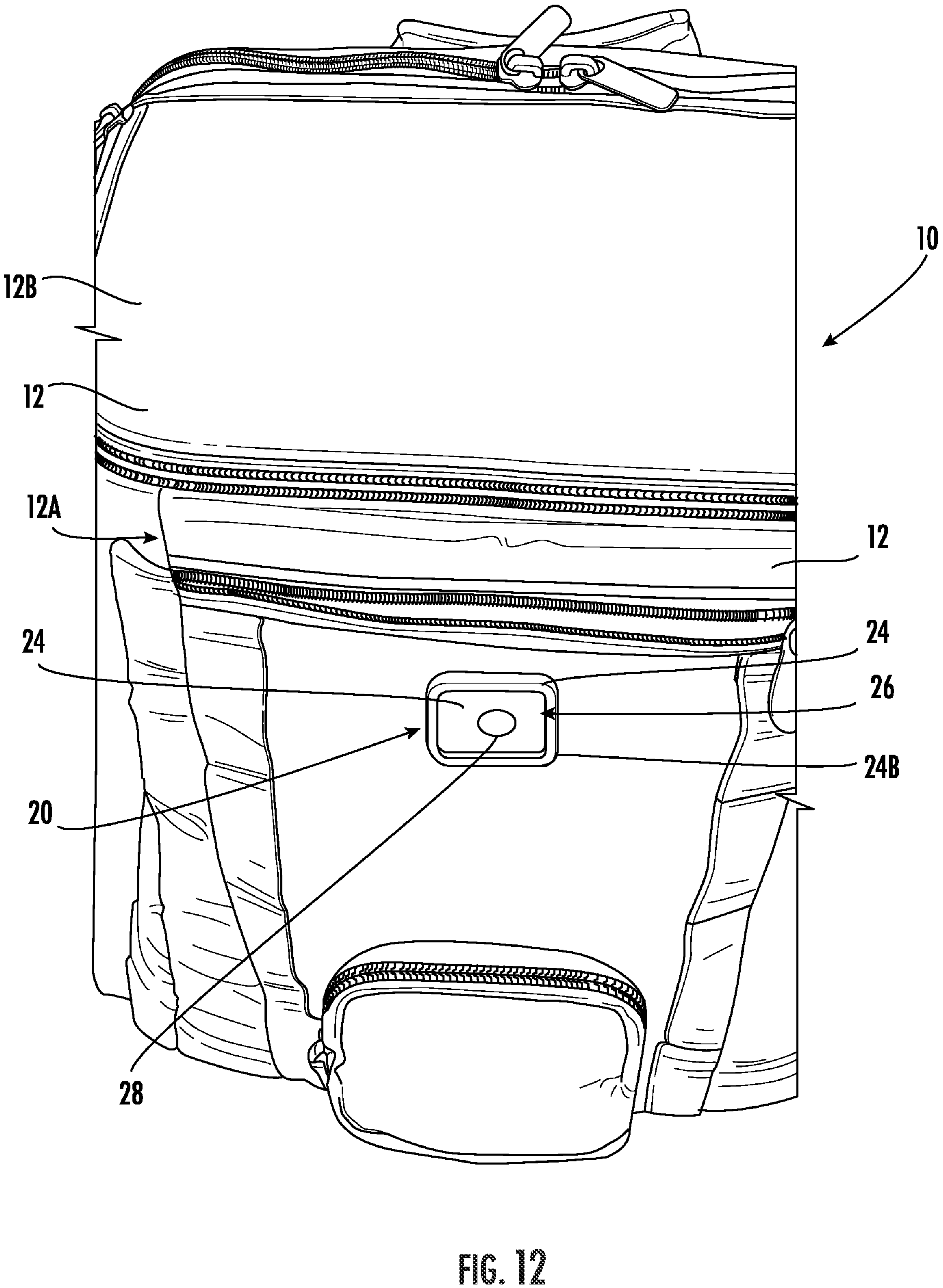
FIG. 12 illustrates a perspective view of the portion of the embodiment of the container with the embodiment of the marker device thereon according to FIG. 9 showing an empty marker receiving station of the marker housing after removal of the mark plate according the present subject matter.

A method of use of the marker device on a container can now be explained with reference to FIGS. 1 and 9-13. For example, a method of using a marker device for displaying personalized information on a container can be provided where the methods include providing a container 10, such as a travel bag, with a marker device 20 thereon where the marker device 20 can comprise one or more marker plates, such as first marker plate 22 which can each comprise a metal plate having a first side 22A and a second side 22B with a first message 22C on the first side 22A or the second side 22B. The marker device 20 can comprise a marker housing 24 secured to the container 10. The marker housing 24 can comprise a base 24A and perimeter walls 24B extending upward from the base 24A to form a marker receiving station 26. Further, the marker device 20 can comprise a housing magnet 28 positioned relative to the base 24A of the marker housing 24. As shown in FIG. 9, when an owner of the container wants to add a personalized message such as the owner's initials or name, a company or sports teams' logo, or the like, a first marker plate 22 of the one or more marker plates can be inserted into the marker receiving station 26 of the marker plate housing 24. The first marker plate 22 can be held within the marker receiving station 26 with the housing magnet 20 so that the message 22C of the owner's initials in the embodiment shown on the first side 22A of the first marker plate 22 faces outward. When the owner wants to change the personalized message, the owner can use the removal tool 30, which the owner can keep in the pocket in the travel bag 10 or another secure place that can be accessible to the owner when needed. The owner can place the puller magnet 34 of the removal tooler 30 as shown in FIG. 10. As stated above, the puller magnet 34 of the removal tooler 30 can have a stronger magnetic field strength than a magnetic field strength of the housing magnet 28. The first marker plate 22 can then be pulled out of and removed from the marker receiving station 26 of the marker housing 24 using a removal tool 30 as shown in FIG. 11. So that the marker receiving station 26 of the marker housing 24 is left empty as shown in FIG. 12. The removed first marker plate can then be removed from the removal tool 30 and stored in a safe convenient place.

Figure 13:
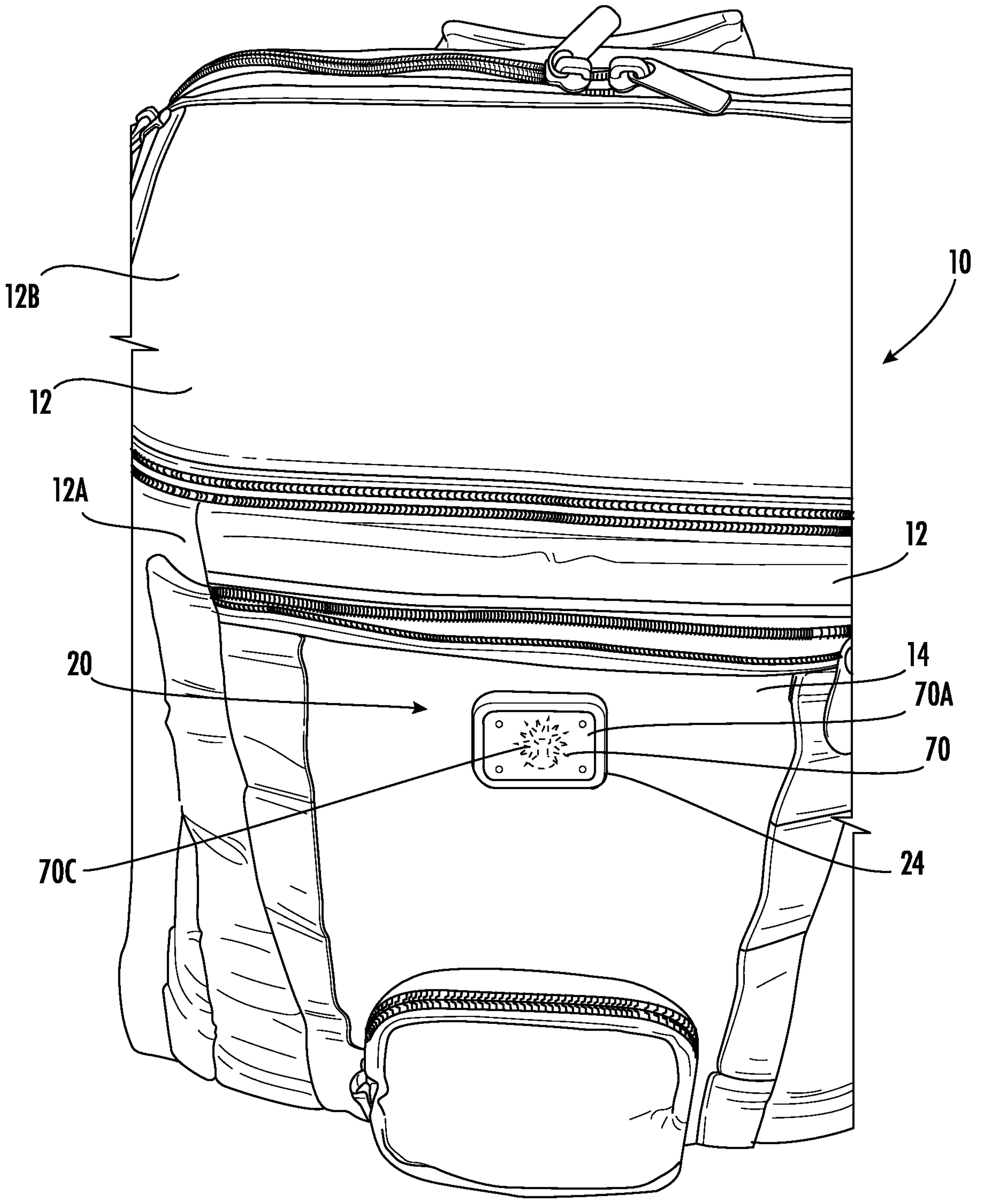
FIG. 13 illustrates a perspective view of the portion of the embodiment of the container with the embodiment of the marker device thereon according to FIG. 9 showing a new marker plate with a different message thereon inserted in marker receiving station of the marker housing according the present subject matter.

A second marker plate 70 of the one or more marker plates can be chosen that a desired message 70C on a first side 70A of the second marker plate 70 that the owner wants to display. For example, the message 70C can be a logo of a sports team or a company. The second marker plate 70 can then be inserted into the marker receiving station 26 of the marker housing 24 such that the second marker plate 70 can be held within the marker receiving station 26 with the housing magnet 28 so that the message 70C on the first side 70A of the second marker plate 70 faces outward as shown in FIG. 13. When the owner once again wants to change the message that they display, the second marker plate 70 can then be removed from the marker receiving station 26 of the marker housing 24 using the removal tool 30. In the alternative, instead of inserting the second marker plate or a third marker plate, the second side of the first marker plate 22 can have a message thereon and the first marker plate 22 can be inserted into the marker receiving station 26 of the marker housing 24 such that the first marker plate 22 is held within the marker receiving station 26 with the housing magnet 28 so that the message on the second side 22B of the first marker plate 22 faces outward.

Thus, as described above, a container 10, such as a travel bag shown in FIGS. 1 and 9-13, is provided that can have changeable personalized information displayed thereon. The container 10 can comprise one or more container walls 12 forming a cavity of the container 10 into which items can be placed. The container 10 can comprise a marker device 20 for displaying personalized information on the container 10. The marker device 20 can comprise one or more marker plates 22, with each marker plate 22 comprising a metal and having a first side 22A and a second side 22B with at least one message 22C on at least one of the first side 22A or the second side 22B. The marker plate. The marker device 20 can also have a marker housing 24 that is secured to the container 10. The marker housing 24 can comprise a base 24A and perimeter walls 24B extending upward from the base 24A to form a marker receiving station 26. The marker device 20 can comprise a housing magnet 28 positioned relative to the base 24A of the marker housing 24 to hold the marker plate 22 in the marker receiving station 26 of the marker housing 24 within the perimeter walls 24B. Each of the one or more marker plates 22 is insertable into the marker receiving station 26 of the marker housing 24 to be held therein by the housing magnet and is removable from the marker receiving station 26 of the marker housing 24 using a removal tool 30 that has a puller magnet 34 therein with a stronger magnetic field strength than a magnetic field strength of the housing magnet 28.

As outlined above, the container 10 can comprises a variety of different types of containers, including but not limited to different types of bags. For example, as shown, the container 10 can comprise a softwalled travel bag. In some such embodiments, the one or walls of the softwalled travel bag can comprise one or more fabric layers and the marker housing 24 can be secured to at least one fabric layer of the one or more fabric layers. The one or walls of the softwalled travel bag 10 can comprise a pocket 14 and the marker housing 24 can be secured to the pocket 14.

Thus, as described above, different marker devices, marker systems, containers with marker devices thereon for displaying personalized information and related methods are disclosed.

These and other modifications and variations to the present subject matter may be practiced by those of ordinary skill in the art, without departing from the spirit and scope of the present subject matter, which is more particularly set forth herein above and any appending claims. In addition, it should be understood the aspects of the various embodiments may be interchanged either in whole or in part. Furthermore, those of ordinary skill in the art will appreciate that the foregoing description is by way of example only and is not intended to limit the present subject matter.

What is claimed is:

1. A marker device for displaying personalized information on a container, the marker device comprising:

a marker plate comprising a metal and having a first side and a second side with at least one message on at least one of the first side or the second side and having a thickness, the marker plate further comprising a protrusion on the first side to identify the first side from the second side of the marker plate, wherein a formation of the protrusion on one side of the marker plate forms an indention on the second side of the marker plate;

a marker housing that is attachable to a container, the marker housing comprising a base having a first side and a second side and perimeter walls extending upward from the first side of the base to form a marker receiving station, the first side of the marker housing comprising an indentation and the first side of the base comprising a flat planar surface that extends from around the indentation to the perimeter walls; and a housing magnet positioned in the indentation of the first side of the base of the marker housing configured to hold the marker plate in the marker receiving station of the marker housing within the perimeter walls, the housing magnet having a magnetic field strength of between about 120 millitesla (mT) to about 140 mT; and the marker plate being insertable into the marker receiving station of the marker housing and held therein by the housing magnet and the marker plate being adapted to be removable from the marker receiving station of the marker housing using a removal tool that has a puller magnet therein with a stronger magnetic field strength than a magnetic field strength of the housing magnet, wherein the puller magnet has a magnetic field strength of greater than about 140 mT.

2. The marker device according to claim 1, wherein the perimeter walls have a height that is about equal to or greater than the thickness of the marker plate.

3. The marker device according to claim 1, wherein the indentation is shaped to receive the housing magnet therein and the indentation in the first side of the marker housing comprising a depth that corresponds to a thickness of the housing magnet.

4. The marker device according to claim 1, further comprising a back plate that receives a portion of the marker housing to secure the marker housing to the container such that the marker housing resides on an outward portion of the container.

5. A marker system for displaying changeable personalized information on a container, the marker system comprising:

one or more marker plates, each marker plate comprising a metal and having a first side and a second side with at least one message on at least one of the first side or the second side, the one or more marker plates each comprising a protrusion on the first side to identify the first side from the second side of the marker plate, wherein a formation of the protrusion on one side of the marker plate forms an indention on the second side of the marker plate;

a marker housing that is attachable to a container, the marker housing comprising a base having a first side and a second side and perimeter walls extending upward from the first side of the base to form a marker receiving station, the first side of the marker housing comprising an indentation and the first side of the base comprising a flat planar surface that extends from around the indentation to the perimeter walls; and a housing magnet positioned in the indentation of the first side of the base of the marker housing to hold the marker plate in the marker receiving station of the marker housing within the perimeter walls, wherein the housing magnet has a magnetic field strength of between about 120 millitesla (mT) to about 140 mT; and a removal tool comprising a handle portion and a puller magnet, the removal tool configured to a remove a marker plate from the marker receiving recess in the marker housing, the puller magnet having a magnetic field intensity that is greater than the magnetic field intensity of the housing magnet, wherein the puller magnet has a magnetic field strength of greater than about 140 mT.

6. The marker system according to claim 5, wherein the marker plate has a thickness and the perimeter walls of the marker housing have a height that is about equal to or greater than the thickness of the marker plate.

7. The marker system according to claim 5, wherein the indentation is shaped to receive the housing magnet therein the indentation in the first side of the marker housing comprising a depth that corresponds to a thickness of the housing magnet.

8. The marker system according to claim 5, wherein the housing magnet resides within the base on the marker housing with an axis of the housing magnet extending about perpendicular to the base and the housing magnet is axially magnetized along the axis.

9. The marker system according to claim 5, further comprising a back plate that receives a portion of the marker housing to secure the marker housing to the container such that the marker housing resides on an outward portion of the container.

10. A container having personalized information displayed thereon that is changeable, the container comprising;

one or more container walls forming a cavity of the container into which items can be placed; and a marker device for displaying personalized information on the container, the marker device comprising:

a marker plate comprising a metal and having a first side and a second side with at least one message on at least one of the first side or the second side, the marker plate further comprising a protrusion on the first side to identify the first side from the second side of the marker plate;

a marker housing secured to the container, the marker housing comprising a base having a first side and a second side and perimeter walls extending upward from the first side of the base to form a marker receiving station, the first side of the marker housing comprising an indentation and the first side of the base comprising a flat planar surface that extends from around the indentation to the perimeter walls;

a housing magnet positioned in the indentation of the first side of the base of the marker housing configured to hold the marker plate in the marker receiving station of the marker housing within the perimeter walls, wherein the housing magnet has a magnetic field strength of between about 120 mT to about 140 mT; and the marker plate being insertable into the marker receiving station of the marker housing and held therein by the housing magnet and the marker plate being removable from the marker receiving station of the marker housing using a removal tool that has a puller magnet therein with a stronger magnetic field strength than a magnetic field strength of the housing magnet.

11. The container according to claim 10, wherein the container comprises a softwalled travel bag and one or more walls of the softwalled travel bag comprise one or more fabric layers and the marker housing is secured to at least one fabric layer of the one or more fabric layers.

12. The container according to claim 10, wherein an axis of the housing magnet extending about perpendicular to the base and the housing magnet is axially magnetized along the axis.

13. A method of using a marker device for displaying personalized information on a container, the method comprising:

providing a container with a marker device thereon, the marker device comprising:

one or more marker plates, each marker plate comprising a metal and having a first side and a second side with a message on at least one of the first side or the second side the one or more marker plates each comprising a protrusion on the first side to identify the first side from the second side of the marker plate;

a marker housing secured to the container, the marker housing comprising a base having a first side and a second side and perimeter walls extending upward from the first side of the base to form a marker receiving station, the first side of the marker housing comprising an indentation and the first side of the base comprising a flat planar surface that extends from around the indentation to the perimeter walls; and a housing magnet positioned in the indentation of the first side of the base of the marker housing, wherein the housing magnet has a magnetic field strength of between about 120 millitesla (mT) to about 140 mT;

inserting a first marker plate of the one or more marker plates into the marker receiving station of the marker housing and holding the first marker plate within the marker receiving station with the housing magnet so that the message on the first side of the first marker plate faces outward; and removing the first marker plate from the marker receiving station of the marker housing using a removal tool that has a puller magnet therein with a stronger magnetic field strength than a magnetic field strength of the housing magnet, wherein the puller magnet has a magnetic field strength of greater than about 140 mT.

14. The method according to claim 13, further comprising inserting a second marker plate of the one or more marker plates into the marker receiving station of the marker housing and holding the second marker plate within the marker receiving station with the housing magnet so that the message on the first side of the second marker plate faces outward.

15. The method according to claim 14, further comprising removing the second marker plate from the marker receiving station of the marker housing using a removal tool.

* * * * *